United States Patent
Matsukawa et al.

(10) Patent No.: US 7,467,959 B2
(45) Date of Patent: Dec. 23, 2008

(54) MEMORY CARD CONNECTOR WITH CARD EJECT MECHANISM

(75) Inventors: Jun Matsukawa, Yamato (JP); Mitsuhiro Tomita, Yamato (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/577,183

(22) PCT Filed: Oct. 26, 2004

(86) PCT No.: PCT/US2004/035488

§ 371 (c)(1), (2), (4) Date: Mar. 12, 2007

(87) PCT Pub. No.: WO2005/045750

PCT Pub. Date: May 19, 2005

(65) Prior Publication Data

US 2007/0155210 A1    Jul. 5, 2007

(30) Foreign Application Priority Data

Oct. 31, 2003  (JP)  ............................. 2003-371988

(51) Int. Cl.
*H01R 13/62* (2006.01)

(52) U.S. Cl. ..................................................... 439/159

(58) Field of Classification Search ................. 439/159, 439/160
See application file for complete search history.

(56) References Cited

U.S. PATENT DOCUMENTS

| 6,394,827 B2 * | 5/2002 | Nogami | ....................... 439/159 |
| 6,478,591 B1 * | 11/2002 | Chang | .......................... 439/159 |
| 2003/0151901 A1 | 8/2003 | Nogami | |

FOREIGN PATENT DOCUMENTS

| EP | 1 132 860 A2 | 9/2001 |
| JP | 2001-291552 | 10/2001 |

* cited by examiner

*Primary Examiner*—Tho D Ta
(74) *Attorney, Agent, or Firm*—Charles S. Cohen

(57) ABSTRACT

A memory card connector (10) is provided with an insulating housing (12) having a rear terminal-mounting section (26) which mounts a plurality of terminals having contact portions for engaging appropriate contacts on a memory card (22). A metal shell (14) is mounted on the housing and combines therewith to define a cavity having a front insertion opening to permit insertion and withdrawal of the memory card into and out of the connector. A card eject mechanism includes a slider (50) movably mounted on the housing and engageable with the memory card for movement therewith into and out of the cavity. The slider has a cam slot (52) defining movement of the card in the card-insertion and card-withdrawal directions. A cam pin (64) is operatively engageable in the cam slot of the slider. The cam pin (64) is formed from the metal shell.

19 Claims, 5 Drawing Sheets

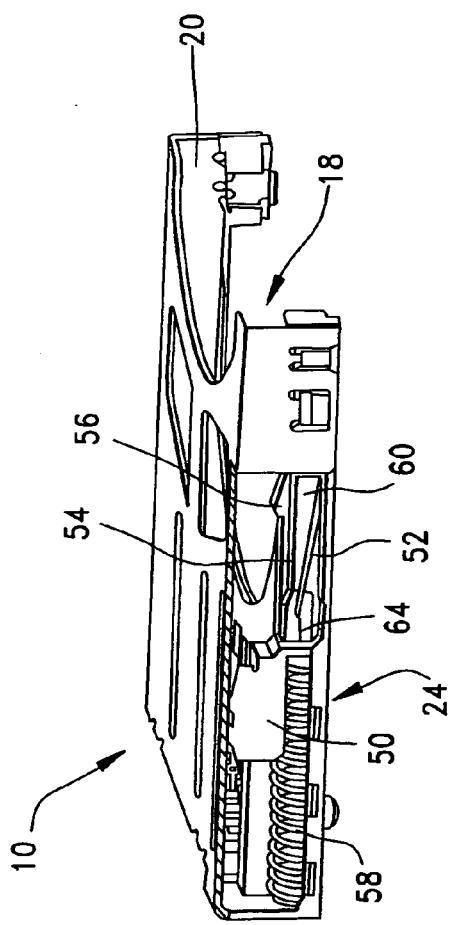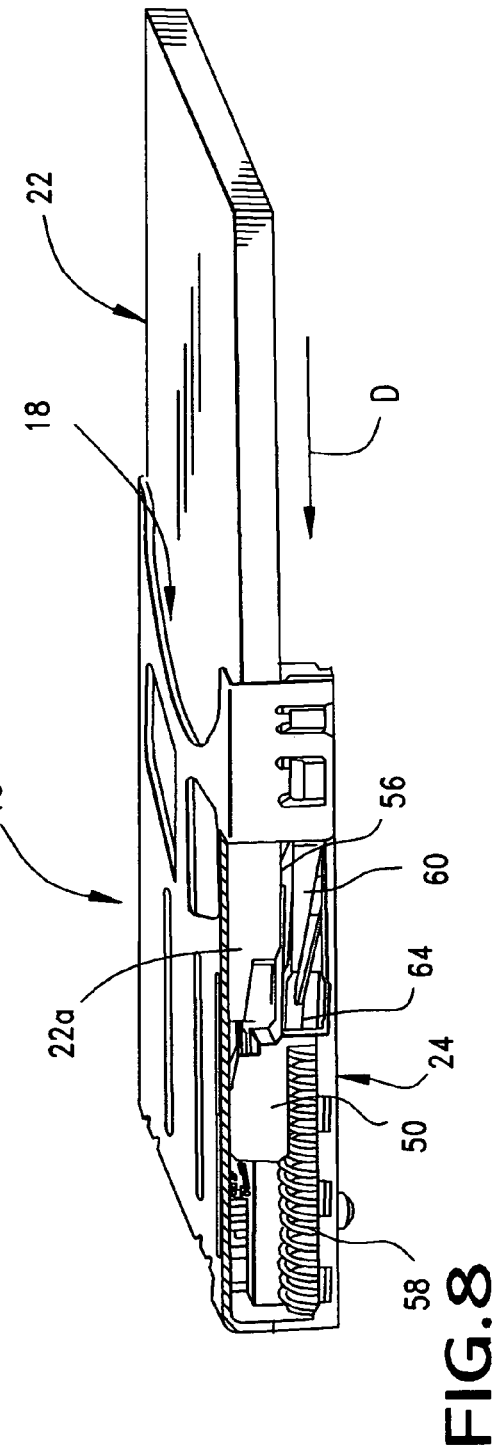

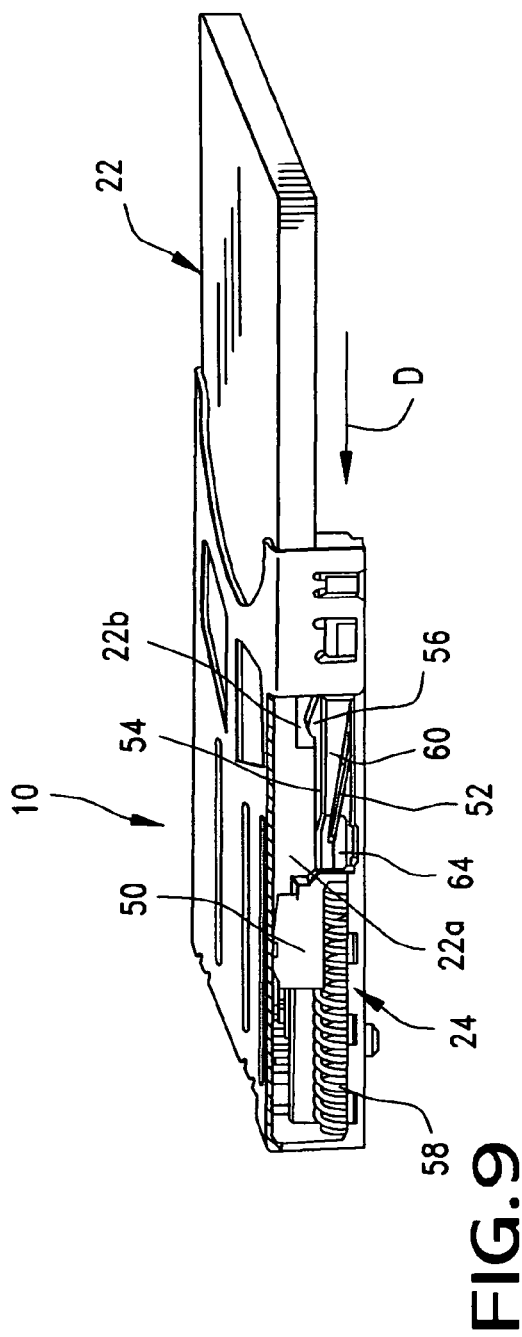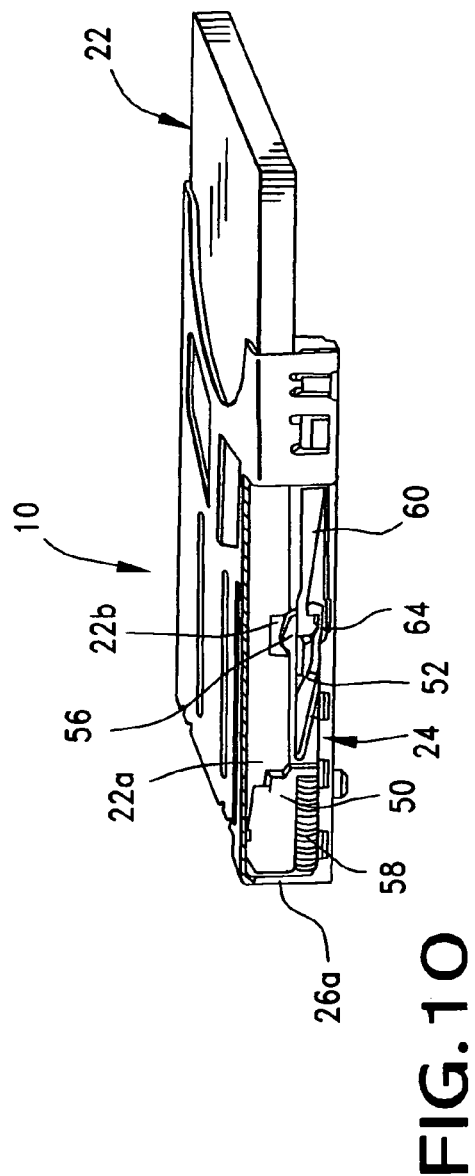

MEMORY CARD CONNECTOR WITH CARD EJECT MECHANISM

FIELD OF THE INVENTION

This invention generally relates to the art of electrical connectors and, particularly, to a memory card connector.

BACKGROUND OF THE INVENTION

Memory cards are known in the art and contain intelligence in the form of a memory circuit or other electronic program. Some form of card reader reads the information or memory stored on the card. Such cards are used in many applications in today's electronic society, including video cameras, digital still cameras, smartphones, PDA's, music players, ATMs, cable television decoders, toys, games, PC adapters, multimedia cards and other electronic applications. Typically, a memory card includes a contact or terminal array for connection through a card connector to a card reader system and then to external equipment. The connector readily accommodates insertion and removal of the card to provide quick access to the information and program on the card. The card connector includes terminals for yieldingly engaging the contact array of the memory card.

The memory card, itself, writes or reads via the connector and can transmit between electrical appliances, such as a word processor, personal computer, personal data assistant or the like. The card may be used in applications such as mobile or cellular telephones which are actuated and permit data access after identifying an identification code stored on a SIM (subscriber identification module) card. The SIM card has a conductive face with an array of contacts, and the mobile phone has a SIM card connector with terminals for electrical connection with the contacts of the SIM card to ensure the subscriber identification confirmation.

A typical memory card connector includes some form of dielectric housing which is covered by a metal shell. The metal shell may be stamped and formed of sheet metal material and formed substantially into a box-shape. The metal shell and the housing combine to define a card-receiving cavity. One end of the cavity is open to form a card-insertion opening. The dielectric housing may be generally L-shaped or U-shaped and includes a rear terminal-mounting section at the rear of the cavity, and at least one longitudinal side wall section extends forwardly from one or both ends of the rear section at one or both sides of the cavity. The metal shell has a top plate substantially covering the dielectric housing, with side plates extending downwardly over the side wall sections of the housing. One or both of the side wall sections of the housing define the sides of the card-receiving cavity.

Some card connectors include a card eject mechanism whereby the memory card is simply inserted into the connector, and the ejector mechanism is used to facilitate removal of the card from the connector. Some eject mechanisms include slider members which engage the memory card for movement therewith into and out of the connector. Latches, cams, eject devices and other operative components then are operatively associated with the slider rather than the memory card itself. One type of card eject mechanism includes a heart-shaped cam slot in the slider, with a pin member operatively biased into the heart-shaped cam slot, and with a spring member to normally bias the slider in a direction of withdrawal of the memory card. This type of card eject mechanism is called a "push/push type" ejector in that the memory card first is pushed into the cavity of the connector to a latched operative position, and a second push on the card is effective to release the card and allow the spring to eject the card from its latched position.

Such a push/push type eject mechanism has a number of problems or disadvantages due to the number of parts to be assembled which prevents complete automation of the assembly process, requiring some manual assembly. For instance, the cam pin which is associated with the cam slider is extremely small and difficult if not impossible to assemble by automation much less by hand. The cam pin easily comes out of the cam slot when subjected to even minor vibrations during other assembly operations, such as installing the metal shell. The present invention is directed to solving these problems.

SUMMARY OF THE INVENTION

An object, therefore, of the invention is to provide a memory card connector with an improved eject mechanism.

In the exemplary embodiment of the invention, the memory card connector includes an insulative housing having a rear terminal-mounting section which mounts a plurality of terminals having contact portions for engaging appropriate contacts on a memory card. A metal shell is mounted on the housing and combines therewith to define a cavity having a front insertion opening to permit insertion and withdrawal of the memory card into and out of the connector. A card eject mechanism includes a slider movably mounted on the housing and engageable with the memory card for movement therewith into and out of the cavity. The slider has a cam slot defining movement of the card in the card-insertion and card-withdrawal directions. A cam pin is operatively engageable in the cam slot of the slider. The cam pin is formed from the metal shell.

According to one aspect of the invention, the cam pin is provided by a projection stamped and formed out of the metal shell. In the preferred embodiment, the projection is near a distal end of a resilient arm stamped and formed out of the metal shell. The cam pin can be a bent portion of the arm near the distal end thereof. In an alternative embodiment, the cam pin comprises a post attached to the distal end of the resilient arm.

According to another aspect of the invention, the metal shell includes a top cover plate overlying at least a portion of the cavity, and at least one side wall plate depending from the top cover plate. The resilient arm is stamped and formed out of the side wall plate of the metal shell, with the projection near the distal end of the arm.

According to a further aspect of the invention, the resilient arm is stamped and formed out of the top cover plate of the metal shell. Again, the cam pin is formed by a projection near the distal end of the resilient arm of the top cover plate.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 7 is a front perspective view of the connector, with the shell broken away to show the slider in an initial position in which the connector is ready to receive a memory card;

FIG. 8 is a view similar to that of FIG. 7, with a memory card inserted into the connector, and with the cam slider in its card insertion position which substantially corresponds to the initial position of FIG. 7;

FIG. 9 is a view similar to that of FIG. 8, with the card in engagement with the cam slider;

FIG. 10 is a view similar to that of FIG. 9, with the card and slider moved to the overruning position;

DETAILED DESCRIPTION OF THE PREFERRED EMBODIMENTS

Figure 1:
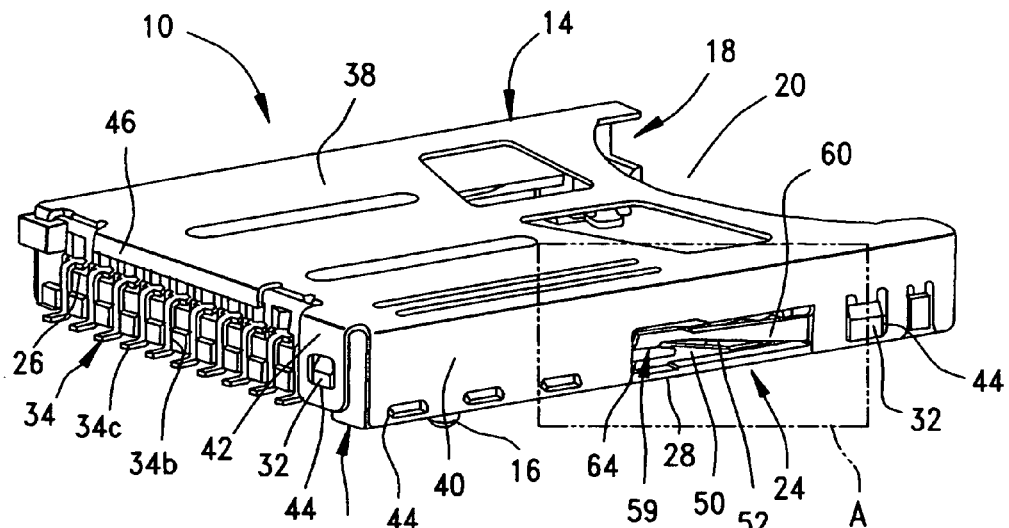
FIG. 1 is a rear perspective view of a memory card connector according to one embodiment of the invention.

Referring to the drawings in greater detail, and first to FIG. 1, the invention is embodied in a memory card connector, generally designated 10, which includes an insulative housing, generally designated 12, substantially enclosed within a metal shell, generally designated 14. The housing may be molded of dielectric material such as plastic or the like. The shell may be stamped and formed of sheet metal material. The connector is adapted for mounting on a printed circuit board, and the housing has a plurality of mounting posts 16 for insertion into appropriate mounting holes in the circuit board. The shell combines with the housing to define a cavity, generally designated 18, having a front insertion opening 20 to permit insertion and withdrawal of a memory card 22 (FIGS. 8-11) into and out of the connector. A push/push type card eject mechanism, generally designated 24, lies at one longitudinal side of cavity 18.

Figure 5:
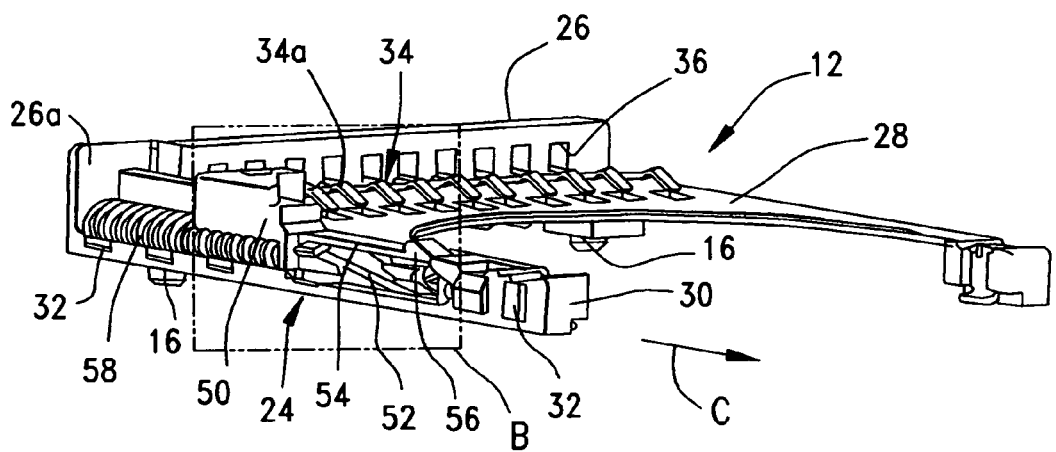
FIG. 5 is a front perspective view of the housing of the connector.
Figure 6:
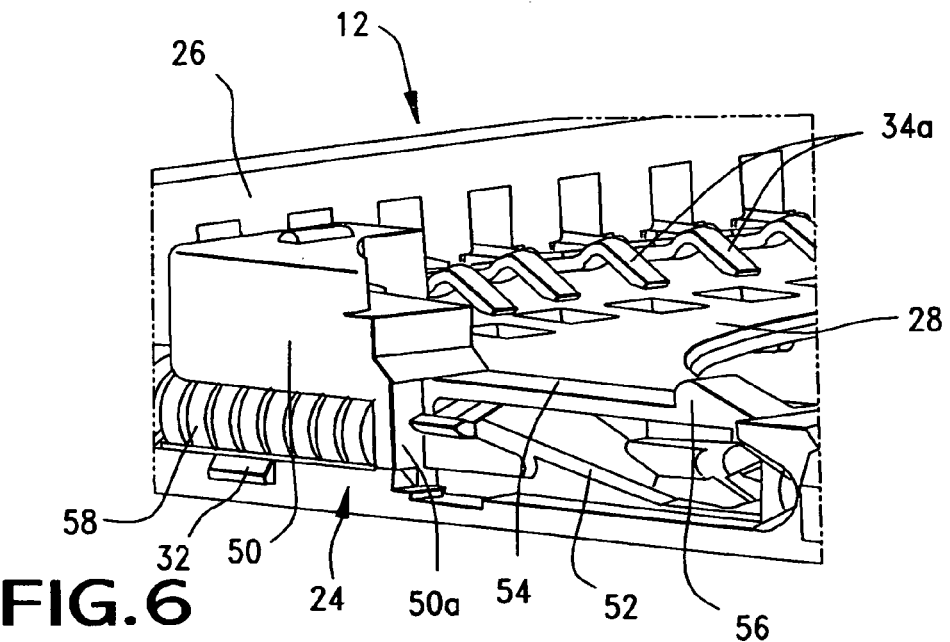
FIG. 6 is an enlarged depiction of the area bounded at "B" in FIG. 5.

Referring to FIG. 5 in conjunction with FIG. 1, housing 12 of connector 10 includes a rear terminal-mounting section 26 projecting upwardly from an arc-shaped bottom plate 28. At least one side wall section 30 projects forwardly from one side of the rear terminal-mounting section 26 at one side of the cavity. A plurality of engagement bosses 32 project outwardly from the side wall section as well as rearwardly of the rear section.

A plurality of terminals, generally designated 34, are mounted in through passages 36 in rear section 26. The terminals have resilient contact arms 34a cantilevered into the rear of cavity 18 for engaging appropriate contacts on the memory card. The terminals have solder tail portions 34b projecting out of the rear of section 26 of the housing, with feet portions 34c at the bottoms of the solder tail portions for connection, as by soldering, to appropriate circuit traces on the printed circuit board.

Metal shell 14 of connector 10 includes a top cover plate 38 substantially covering the top of housing 12 and overlying cavity 18. A pair of side wall plates 40 depend along opposite side edges of the top cover plate to cover the outside of side wall section 30 of the housing and substantially delimit cavity 18. A rear latch tab 42 projects downwardly from a rear edge of the top cover plate. The side wall plate and the rear latch tab include engagement openings 44 for latchingly engaging engagement bosses 32 of the housing to fix the cover on top of the housing. A rear positioning flange 46 runs along the rear of top cover plate 38 against the top rear edge of the rear terminal-mounting section 26 of the housing.

Referring to FIGS. 1, 2, 5 and 6, eject mechanism 24 is provided for ejecting the memory card out of cavity 18 in the direction of arrow "C" (FIG. 5). The eject mechanism is a push/push type ejector and includes a cam slider 50 movably mounted on side wall section 30 of the housing and engageable with the memory card for movement therewith into and out of cavity 18. The slider has a cam slot 52 in the side thereof and which, as is known in the art, is generally heart-shaped to define the push/push movement of the memory card in a card-insertion and a card-withdrawal direction. The slider slides on bottom plate 28 of the housing. A flexible latch arm 54 is integral with the slider and projects forwardly therefrom and terminates in a latch projection 56 at the forward distal end of the arm. The latch projection latchingly engages the memory card whereby the memory card moves conjointly with the slider. A coil spring 58 is sandwiched between a portion 50a of the slider and a portion 26a of the rear section of the housing to bias the slider forwardly in ejection direction "C".

Generally, a cam follower, generally designated 59, rides within cam slot 52 to control movement of cam slider 50 in its push/push action. According to the invention, the cam follower is formed directly from metal shell 14 so that the follower is not a separate, independent member which must be separately handled during assembly of the connector along with eject mechanism 24.

Figure 2:
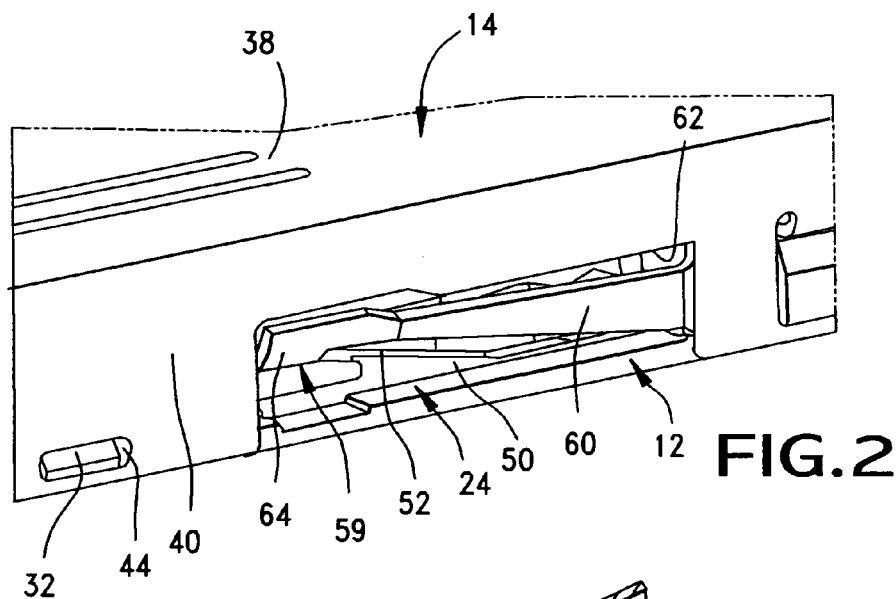
FIG. 2 is an enlarged depiction of the area bounded at "A" in FIG. 1.
Figure 3:
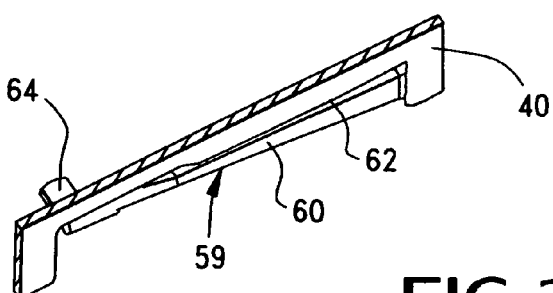
FIG. 3 is a fragmented, enlarged perspective view of the resilient arm and cam pin projection of the embodiment of FIG. 1.
Figure 4:
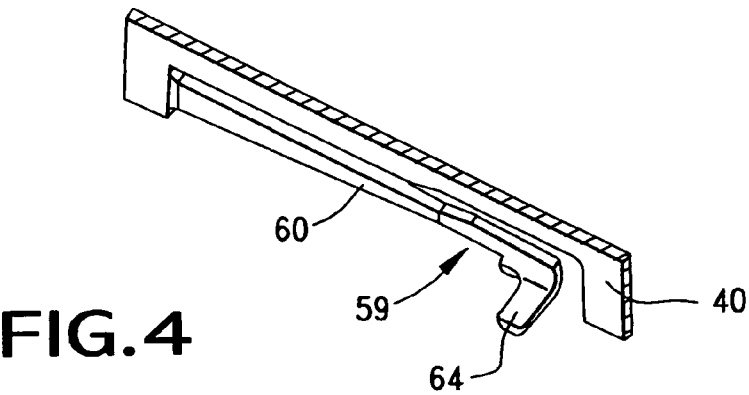
FIG. 4 is a view similar to that of FIG. 3 looking at the back side thereof.

According to one embodiment of the invention, and referring to FIGS. 3 and 4 in conjunction with FIGS. 1 and 2, a resilient arm 60 is stamped and formed out of an opening 62 in side wall plate 40 of metal shell 14. The cam follower comprises a cam pin projection 64 is formed integrally with the distal end of the resilient arm to project inwardly toward cam slot 52 of the eject mechanism. With arm 60 being resilient, the arm constantly biases the cam pin projection inwardly into the cam slot, whereby the cam pin projection of the eject mechanism cannot become dislodged or lost during assembly or use of the connector.

FIGS. 7-11 show how card eject mechanism 24 operates sequentially in response to insertion of a memory card 22 into cavity 18 of connector 10. FIG. 7 basically shows the initial or stand-by position of the connector prior to the memory card being inserted thereinto. In this position, cam slider 50 is biased forwardly by coil spring 58.

FIG. 8 shows a forward end 22a of memory card 22 inserted into cavity 18 of connector 10 in a card-insertion direction indicated by arrow "D". The card is shown having been inserted short of engaging cam slider 50.

FIG. 9 shows memory card 22 inserted in the direction of arrow "D" until forward end 22a of the card engages cam slider 50. At this point, latch projection 56 at the forward distal end of flexible latch arm 54 of the slider "snaps" into a latch recess 22b at the side of the memory card. The card now is latched to the slider for conjoint movement therewith.

Further movement of the memory card in the insertion direction pushes cam slider 50 rearwardly therewith to an overruning position shown in FIG. 10. The extreme rear movement is stopped by rear portion 26a of the housing.

Figure 11:
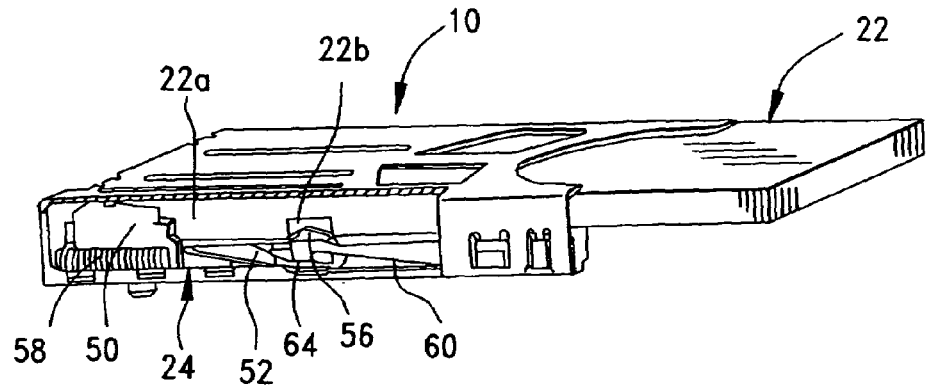
FIG. 11 is a view similar to that of FIG. 10, with the card and slider backed out to the locking position.

Upon removal of the pushing forces on memory card 22, coil spring 58 is effective to bias cam slider 50 and the memory card back outwardly to a locked position shown in FIG. 11 as defined by the interengagement of cam pin projection 64 within cam slot 52. This stopping action is known in the art of such push/push eject mechanisms which include heart-shaped cam slots. When it is desired to withdraw the memory card, the card is pushed back inwardly a second time whereupon the locked condition of the card is released as the cam pin projection moves along the heart-shaped cam slot, whereupon coil spring 58 is effective to eject the card and allow it to be withdrawn from cavity 18 of the connector. In the locked position of the card shown in FIG. 11, appropriate contacts on the card engage contact arms 34a of terminals 34.

Figure 12:
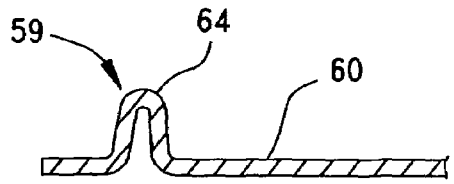
FIG. 12 is a fragmented section through a distal end of a resilient arm and cam pin projection according to a second embodiment of the invention.

As best seen in FIG. 4, cam pin projection 64 of the first embodiment is formed by simply turning a distal end of flexible arm 60 inwardly to form the cam pin projection. FIG. 12 shows a second embodiment wherein the distal end of flexible arm 60 is folded in a ribbon-like manner to form cam pin projection 64. Still, the cam pin projection of the second embodiment in FIG. 12 is integral with the flexible arm and cannot be separated or lost from the overall eject mechanism during assembly or use of the connector.

Figure 13:
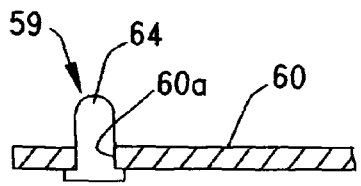
FIG. 13 is a view similar to that of FIG. 12, but of a third embodiment of the invention.

FIG. 13 shows a third embodiment of a cam pin follower wherein a separate cam post 64 is fixed within a through hole 60a in flexible arm 60. The post can be press-fit or adhered within the hole so that it cannot be separated or removed from the arm during assembly and use of the connector.

Figure 14:
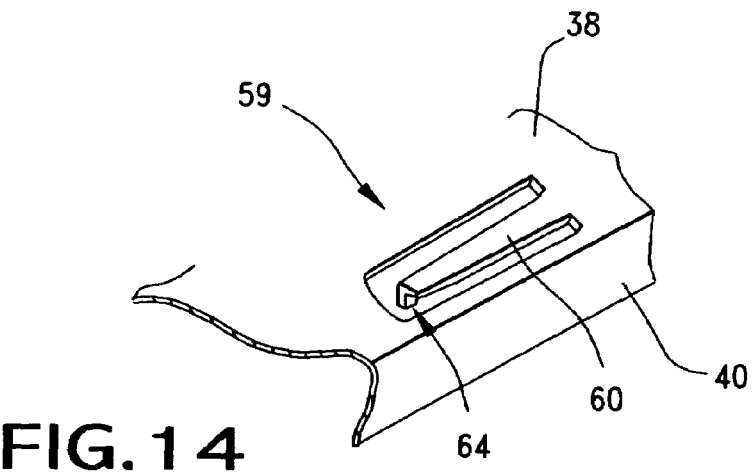
FIG. 14 is a fragmented, sectional view of a portion of the metal shell showing the resilient arm and cam pin projection stamped and formed out of a top plate of the shell.

In the first embodiment of the invention shown in FIGS. 1-11, flexible arm 60 and cam pin projection 64 are stamped and formed out of side wall plate 40 of metal shell 14. FIG. 14 shows still another embodiment of the invention wherein flexible arm 60 and cam pin projection 64 are stamped and formed out of top cover plate 38 of the metal shell. Of course, the cam slot in cam slider 50 must be disposed on top of the slider, rather than at a side of the slider as in the first embodiment. As with all of the embodiments, the cam pin projection is integral with or fixed to the flexible arm so that it cannot become dislodged therefrom during assembly or use of the connector.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A memory card connector, comprising:
    an insulative housing having a rear terminal-mounting section which mounts a plurality of terminals having contact portions for engaging appropriate contacts on a memory card;
    a metal shell mounted on the housing and combining therewith to define a cavity having a front insertion opening to permit insertion and withdrawal of the memory card into and out of the connector;
    a card eject mechanism including a slider movably mounted on the housing and engageable with the memory card for movement therewith into and out of the cavity, the slider having a heart-shaped cam slot defining movement of the card in the card-insertion and card-withdrawal directions; and
    a cam pin formed integrally with the metal shell and being operatively engageable in the cam slot of the slider.

2. The memory card connector of claim 1 wherein said metal shell includes a flexible arm stamped and formed therefrom, and said cam pin is formed by a bent portion near a distal end of the flexible arm.

3. The memory card connector of claim 1 wherein said cam pin comprises a projection stamped and formed out of the metal shell.

4. The memory card connector of claim 3 wherein said projection is near a distal end of a flexible arm stamped and formed out of the metal shell.

5. The memory card connector of claim 1 wherein said metal shell includes a top cover plate overlying at least a portion of said cavity and at least one side wall plate depending from the top cover plate.

6. The memory card connector of claim 5 wherein said cam pin comprises a projection stamped and formed out of the side wall plate of the metal shell.

7. The memory card connector of claim 6 wherein said projection is near a distal end of a flexible arm stamped and formed out of the side wall plate of the metal shell.

8. The memory card connector of claim 5 wherein said cam pin comprises a projection stamped and formed out of the top cover plate of the metal shell.

9. The memory card connector of claim 8 wherein said projection is near a distal end of a flexible arm stamped and formed out of the top cover plate of the metal shell.

10. A memory card connector, including:
    an insulative housing having a rear terminal-mounting section which mounts a plurality of terminals having contact portions for engaging appropriate contacts on a memory card;
    a metal shell mounted on the housing and combining therewith to define a cavity having a front insertion opening to permit insertion and withdrawal of the memory card into and out of the connector;
    a card eject mechanism including a slider movably mounted on the housing and engageable with the memory card for movement therewith into and out of the cavity, the slider having a heart-shaped cam slot defining movement of the card in the card-insertion and card-withdrawal directions; and
    a flexible arm formed integrally with the metal shell, said flexible arm having a cam pin operatively engageable in the cam slot of the slider.

11. The memory card connector of claim 10 wherein said cam pin is formed by a bent portion near a distal end of the flexible arm.

12. The memory card connector of claim 10 wherein said cam pin comprise a post attached to a distal end of the flexible arm.

13. The memory card connector of claim 10 wherein said cam pin comprises a projection stamped and formed out of the metal shell.

14. The memory card connector of claim 13 wherein said projection is near a distal end of the flexible arm formed integrally with the metal shell.

15. The memory card connector of claim 10 wherein said metal shell includes a top cover plate overlying at least a portion of said cavity and at least one side wall plate depending from the top cover plate.

16. The memory card connector of claim 15 wherein said cam pin comprises a projection stamped and formed out of the side wall plate of the metal shell.

17. The memory card connector of claim 16 wherein said projection is near a distal end of the flexible arm formed integrally with the side wall plate of the metal shell.

18. The memory card connector of claim 15 wherein said cam pin comprises a projection stamped and formed out of the top cover plate of the metal shell.

19. The memory card connector of claim 18 wherein said projection is near a distal end of the flexible arm formed integrally with the top cover plate of the metal shell.

* * * * *